US012574061B2

(12) United States Patent
Vilagy et al.

(10) Patent No.: US 12,574,061 B2
(45) Date of Patent: Mar. 10, 2026

(54) SYSTEMS, APPARATUSES, AND METHODS FOR TRANSCEIVER FILTERS

(71) Applicant: General Electric Technology GmbH, Baden (CH)

(72) Inventors: Jonathan M. Vilagy, Rochester, NY (US); Christopher R. Hughes, Rochester, NY (US); Jeffrey M. Wilczewski, Rochester, NY (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 688 days.

(21) Appl. No.: 17/892,662

(22) Filed: Aug. 22, 2022

(65) Prior Publication Data

US 2024/0063836 A1 Feb. 22, 2024

(51) Int. Cl.
| | |
|---|---|
| *H04B 1/38* | (2015.01) |
| *H04B 1/034* | (2006.01) |
| *H04B 1/10* | (2006.01) |
| *H04M 1/02* | (2006.01) |
| *H04W 88/02* | (2009.01) |

(52) U.S. Cl.
CPC ............... *H04B 1/38* (2013.01); *H04B 1/034* (2013.01); *H04B 1/1018* (2013.01); *H04M 1/0256* (2013.01); *H04W 88/021* (2013.01)

(58) Field of Classification Search
CPC ............................................. H04W 88/00–06
See application file for complete search history.

(56) References Cited

U.S. PATENT DOCUMENTS

| | | | |
|---|---|---|---|
| 9,413,326 B2 | 8/2016 | Basaran et al. | |
| 10,284,177 B2* | 5/2019 | Caron | .................. H03H 9/6483 |
| 10,939,497 B2 | 3/2021 | Pera et al. | |
| 2004/0097203 A1 | 5/2004 | Folkesson et al. | |

(Continued)

FOREIGN PATENT DOCUMENTS

| | | |
|---|---|---|
| CN | 111355512 A | 6/2020 |
| EP | 3496280 B1 | 9/2021 |
| GB | 2402563 A | 8/2004 |

OTHER PUBLICATIONS

International Search Report and Written Opinion for PCT/US2023/030541, dated Dec. 19, 2023, 15 pages.

*Primary Examiner* — San Htun

(74) *Attorney, Agent, or Firm* — Eversheds Sutherland (US) LLP

(57) ABSTRACT

A transceiver system may include a transmitter, a receiver, an antenna port that is connectable to the transmitter or to the receiver, a filter send port, and a filter return port. The filter ports may be antenna-side or receiver-side, and connectable across at least one filter between the antenna port and the receiver. A transceiver apparatus may include a housing including the transmitter, the receiver, a transceiver switch, and a filter switch assembly in a chamber of the housing. The ports may be accessible through a wall of the housing. A method for filtering a signal include switching, in response to a first signal, a receiver or a transceiver of a transceiver system from an unfiltered path connected to the antenna port to a filtered path connected to the antenna port. The method may further include switching, in response to a second signal, the receiver to the unfiltered path.

18 Claims, 3 Drawing Sheets

(56)     References Cited

U.S. PATENT DOCUMENTS

| | | | |
|---|---|---|---|
| 2005/0048928 A1* | 3/2005 | Jeon | H03H 11/1252 |
| | | | 455/73 |
| 2006/0145781 A1 | 7/2006 | Layne et al. | |
| 2012/0009886 A1 | 1/2012 | Poulin | |
| 2014/0313947 A1* | 10/2014 | Ali-Ahmad | H04L 5/18 |
| | | | 370/278 |
| 2015/0163044 A1* | 6/2015 | Analui | H03F 3/195 |
| | | | 370/295 |
| 2016/0380706 A1* | 12/2016 | Tanzi | H04B 1/48 |
| | | | 455/78 |
| 2017/0064773 A1* | 3/2017 | Anderson | H04B 1/525 |
| 2017/0097484 A1* | 4/2017 | Teo | H05K 1/0274 |
| 2017/0171968 A1 | 6/2017 | Heo et al. | |
| 2017/0346452 A1 | 11/2017 | Wada et al. | |
| 2018/0352607 A1 | 12/2018 | Pera et al. | |
| 2020/0274564 A1 | 8/2020 | Abhishek et al. | |

* cited by examiner

60

100

200

SYSTEMS, APPARATUSES, AND METHODS FOR TRANSCEIVER FILTERS

TECHNICAL FIELD

The present disclosure relates to transceivers, and in particular, to systems, apparatuses, and methods for transceiver filters.

BACKGROUND

Transceivers may transmit or receive signals through an antenna. Signals sent to or received from the antenna may be susceptible to interference. For example, another transmitter or electromagnetic system may generate interfering signals. Duplexers or diplexers may be used to attenuate interfering signals.

SUMMARY

The present disclosure relates to transceivers, and in particular, to systems, apparatuses, and methods for transceiver filters. The transceivers may be radio transceivers.

In embodiments, the present disclosure describes a transceiver system connectable to at least one filter. The transceiver system may include a transmitter, a receiver, an antenna port that is connectable to the transmitter or to the receiver, a filter send port, and a filter return port. One of the filter send port and the filter return port may be antenna-side. The other of the filter send port and the filter return port may be receiver-side. The filter send port and the filter return port may be connectable across the at least one filter between the antenna port and the receiver.

In embodiments, the present disclosure describes a transceiver apparatus connectable to at least one filter. The apparatus may include a housing. The housing may include a transmitter, a receiver, a transceiver switch, and a filter switch assembly in a chamber of the housing. The housing may further include an antenna port, a filter send port, and a filter return port, accessible through a wall of the housing. One of the filter send port and the filter return port may be antenna-side. The other of the filter send port and the filter return port may be receiver-side. The filter send port and the filter return port may be connectable across the at least one filter external to the housing between the antenna port and the receiver. The transmitter may be isolated from each of the filter send port and the filter return port. The filter switch assembly is configured to connect the receiver and the antenna port through (i) the filter, or (ii) an unfiltered path isolated from each of the filter send port and the filter return port. The transceiver switch is configured to connect the antenna port to (i) the transmitter, or (ii) the receiver.

In embodiments, the present disclosure describes a method for filtering a signal. The method may include switching, by a controller, in response to a first signal, a receiver of a transceiver system from an unfiltered path connected to an antenna port to a filtered path connected to the antenna port. The filtered path may include a filter connected between a filter send port and a filter return port of the transceiver system. The filtered path may be isolated from a transmitter of the transceiver system. The method may further include switching, by a controller, in response to a second signal, the receiver from the filtered path to the unfiltered path.

Additional systems, methods, apparatuses, features, and aspects can be realized through the techniques of various embodiments of the disclosure. Other embodiments and aspects of the disclosure are described in detail herein and are considered a part of the claimed subject matter. Other features can be understood and will become apparent with reference to the description and to the drawings.

BRIEF DESCRIPTION OF THE DRAWINGS

Having thus described the disclosure in general terms, reference will now be made to the accompanying drawings, which are not necessarily drawn to scale.

Figure 1:
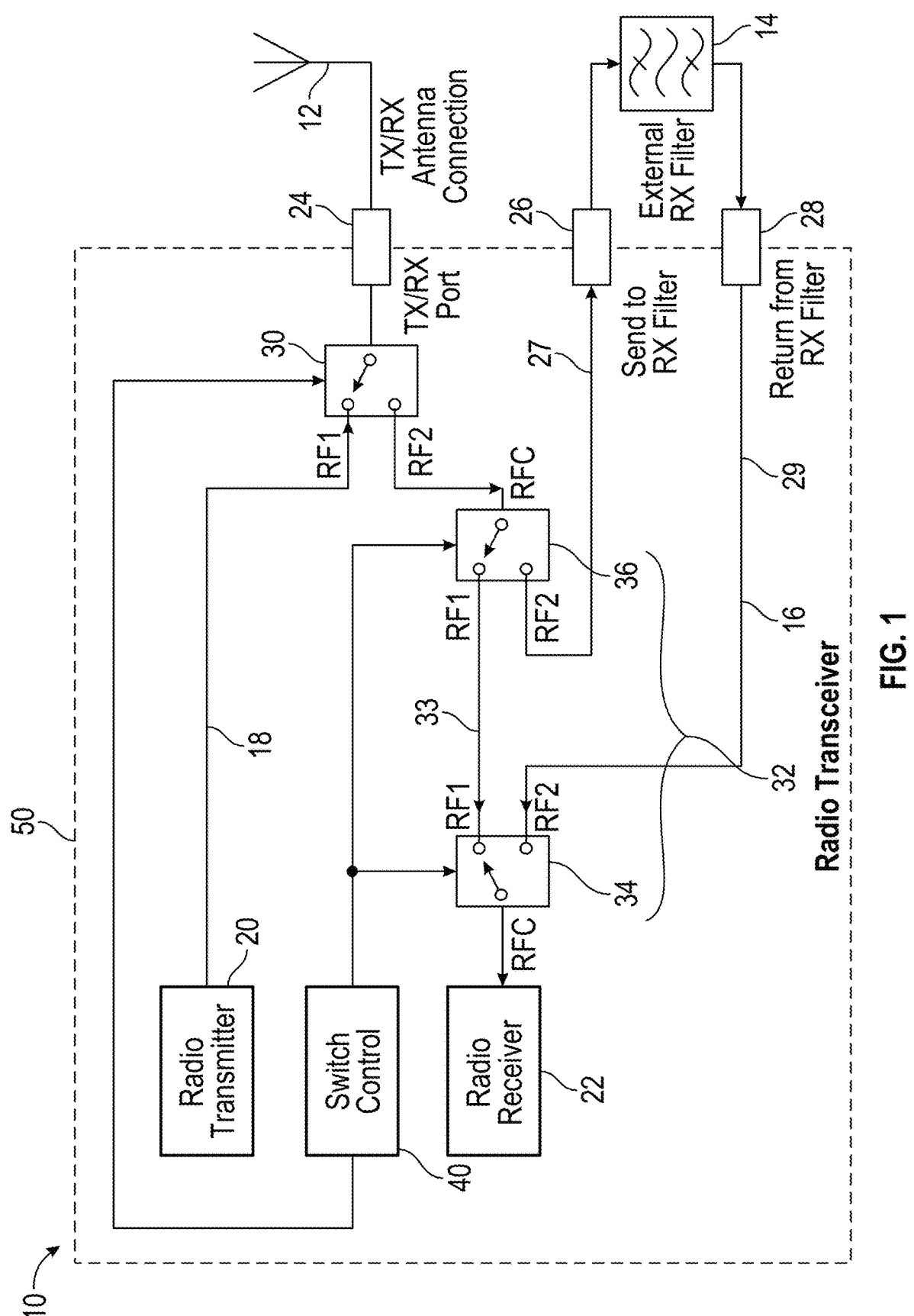

FIG. 1 is a block diagram showing a transceiver system connectable to a transceiver antenna and to at least one filter.

Figure 2:
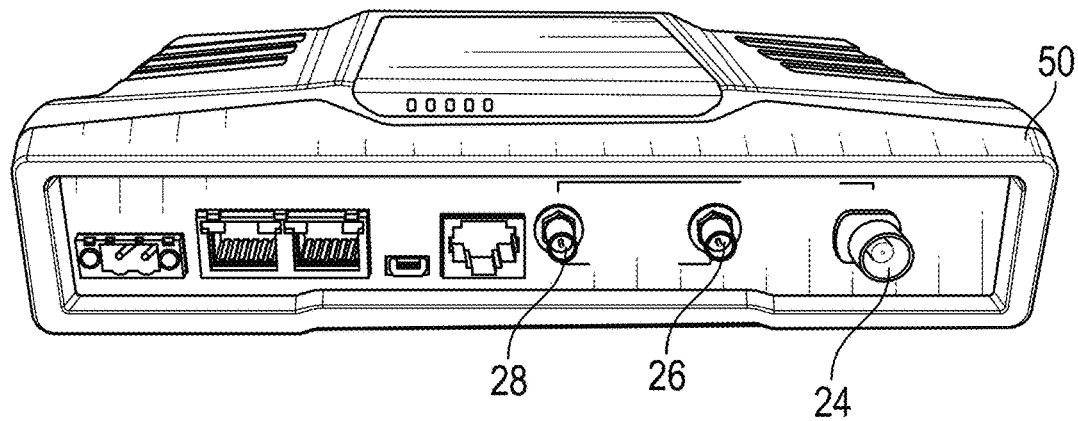

FIG. 2 is a diagram showing a connector view of a transceiver apparatus connectable to a transceiver antenna and to a filter.

Figure 3:
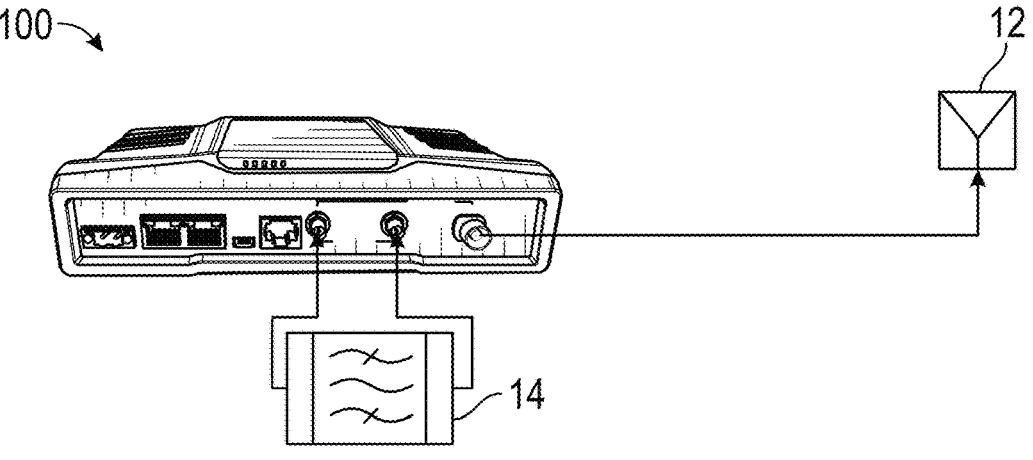

FIG. 3 is a diagram showing an assembly including the transceiver apparatus of FIG. 2 connected to a transceiver antenna and to a filter.

Figure 4:
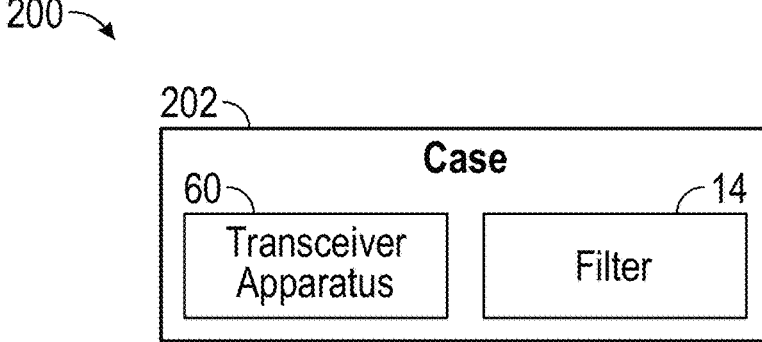

FIG. 4 is a diagram showing a kit including a case or an enclosure including a transceiver apparatus and at least one filter.

Figure 5:
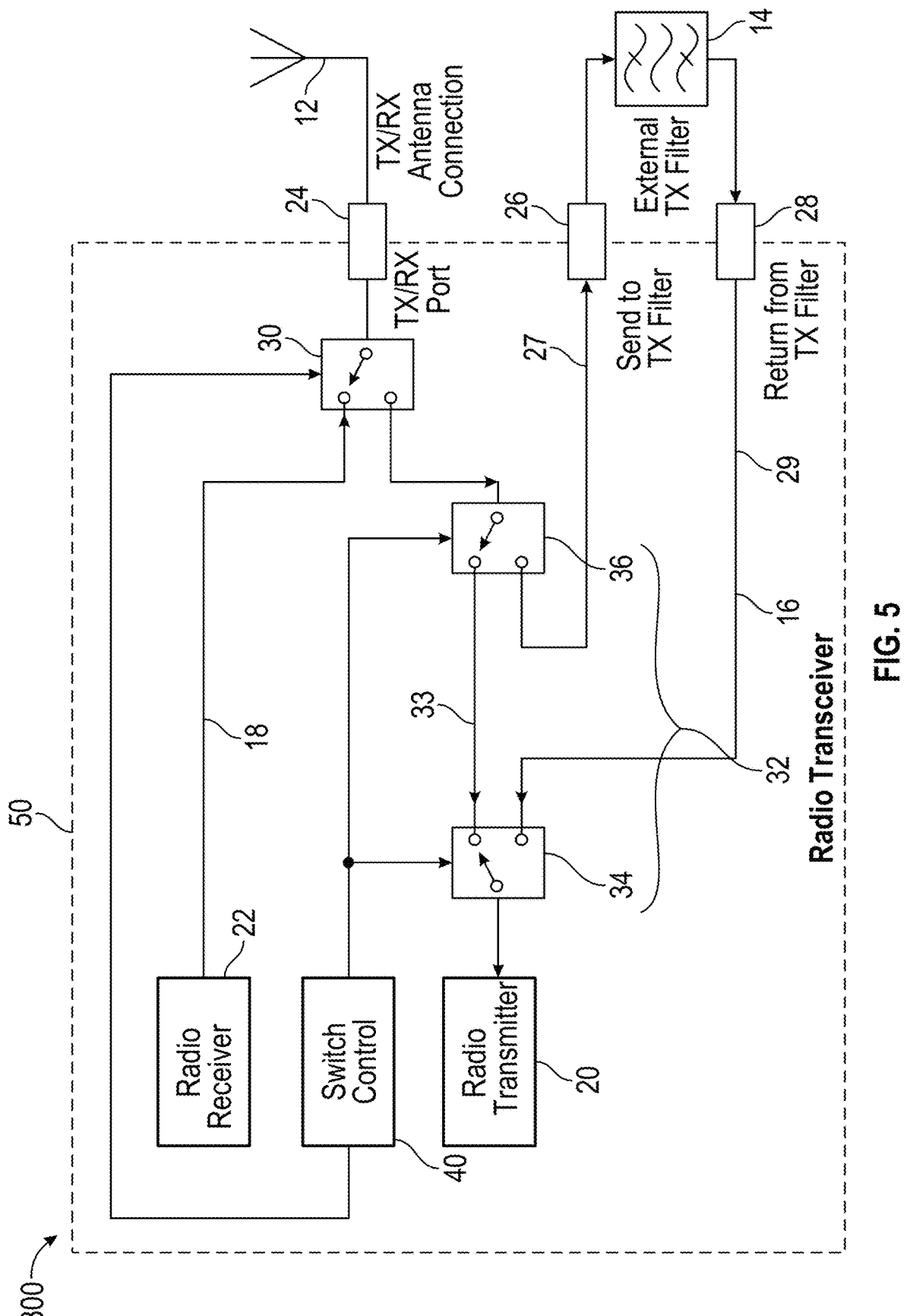

FIG. 5 is a block diagram showing a transceiver system connectable to a transceiver antenna and to at least one transmission filter.

Embodiments of the disclosure are described more fully below with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the present disclosure to those skilled in the art. Like numbers refer to like, but not necessarily the same or identical, elements throughout.

The following embodiments are described in sufficient detail to enable at least those skilled in the art to understand and use the disclosure. It is to be understood that other embodiments would be evident based on the present disclosure and that process, mechanical, material, dimensional, process equipment, and parametric changes may be made without departing from the scope of the present disclosure.

In the following description, numerous specific details are given to provide a thorough understanding of various embodiments of the present disclosure. However, it will be apparent that the present disclosure may be practiced without these specific details. In order to avoid obscuring the present disclosure, some well-known system configurations and process steps may not be disclosed in full detail. Likewise, the drawings showing embodiments of the disclosure are semi-diagrammatic and not to scale and, particularly, some of the dimensions are for the clarity of presentation and may be exaggerated in the drawings. In addition, where multiple embodiments are disclosed and described as having some features in common, for clarity and ease of illustration, description, and comprehension thereof, similar and like features will ordinarily be described with like reference numerals even if the features are not identical

DETAILED DESCRIPTION

The present disclosure relates to transceivers, and in particular, to systems, apparatuses, and methods for transceiver filters. External filters may be inserted in the receiver path of a transceiver to suppress blocking interferers, not incurring losses in the transmitter path and thus retaining full transmitter power. One or more filters may be introduced in the receiver path, targeting receiver interference sources. A single connection point can be used connecting to an antenna system, while adding one or more suitable in-line filters to reduce interfering signals potentially blocking the receiver.

Radios can suffer from receiver degradation in the presence of interfering signals at strong levels. A radio-frequency (RF) filter, for example, low pass, high pass, band pass, band stop, or other types of filters may be used to keep the interfering signal from blocking reception of a desired signal. However, adding an external filter may introduce added insertion loss into a transmitter (TX) path common with the receiver (RX) path, reducing the output power. This in turn may limit the usable distance range of the overall system. The added insertion loss in the TX path may waste energy, limit performance, and increase infrastructure costs.

Instead of using a filter in a common path, TX and RX paths may be split. However, splitting the TX and RX paths into separate external channels may require the use of a combination method so that a single antenna may still be used for the system. External filters may be used with a duplexer or diplexer in combination with targeted filtering to separate TX and RX paths on the transceiver interface. However, such configurations may also add loss to the TX channel reducing system performance, and increase complexity, cost, physical size, weight, and maintenance requirements for the system.

The present disclosure describes systems, apparatuses, and methods which allow inserting one or more external filters in the RF RX path of a transceiver (for example, after an initial TR (Transmit/Receive) switch with the addition of a breakout path). Alternatively, one or more external filters may be similarly inserted in the TX path of the transceiver.

In embodiments, the present disclosure describes a transceiver system connectable to at least one filter. The transceiver system may include a transmitter, a receiver, an antenna port that is connectable to the transmitter or to the receiver, a filter send port, and a filter return port. One of the filter send port and the filter return port may be antenna-side. The other of the filter send port and the filter return port may be receiver-side. The filter send port and the filter return port may be connectable across the at least one filter between the antenna port and the receiver.

Such a configuration does not substantially affect the system losses for the TX path. If no added filtering is required, the alternate filtered path is not used. If there is a blocking signal present causing reduced RX performance, the filter may be switched in so that an appropriate filters for the interference or blocking can be used. A user may use different filters, or a combination of filters, based on the interfering signal. The switching mechanism may be user-selectable, and may be manually controlled, software controlled, or dynamically controlled based on receive signal quality indicators to switch in the required external filter of choice as needed.

In embodiments, the present disclosure describes a transceiver apparatus connectable to at least one filter. The apparatus may include a housing. The housing may include a transmitter, a receiver, a transceiver switch, and a filter switch assembly in a chamber of the housing. The housing may further include an antenna port, a filter send port, and a filter return port, accessible through a wall of the housing. One of the filter send port and the filter return port may be antenna-side. The other of the filter send port and the filter return port may be receiver-side. The filter send port and the filter return port may be connectable across the at least one filter external to the housing between the antenna port and the receiver. The transmitter may be isolated from each of the filter send port and the filter return port. The filter switch assembly is configured to connect the receiver and the antenna port through (i) the filter, or (ii) an unfiltered path isolated from each of the filter send port and the filter return port. The transceiver switch is configured to connect the antenna port to (i) the transmitter, or (ii) the receiver.

Thus, in systems and apparatuses according to the present disclosure, other than the filter itself, no further external infrastructure such as a combiner, duplexer, or diplexer may be required. This is because there is no need to split or combine TX and RX signals to or from a single connection point for the antenna system. Integrated RF switches or discrete circuitry may be used based on the design requirements of the end radio transceiver system.

In embodiments, the present disclosure describes a method for filtering a signal. The method may include switching, by a controller, in response to a first signal, a receiver of a transceiver system from an unfiltered path connected to an antenna port to a filtered path connected to the antenna port. The filtered path may include a filter connected between a filter send port and a filter return port of the transceiver system. The filtered path may be isolated from a transmitter of the transceiver system. The method may further include switching, by a controller, in response to a second signal, the receiver from the filtered path to the unfiltered path.

Using switching in the RX path before combination through the transceivers TR switch may give access for external filtering, as needed for a particular interference or blocking issue, without any added TX path losses being added to the system. The method may still be practiced with a standard single port for antenna connection with two additional ports (the filter send and receive ports) added for introducing a filter into the RX path only, and without affecting the TX path. When needed, the filter send and return ports in the RX path allow for insertion of any type of filter to solve the desired signal reception blocking issue. The switching from the filtered path to the unfiltered path provides a direct connection for the RX path to the antenna when filtering is not needed. In either case of switching, the TX path remains unchanged with no added loss for a standard transceiver design. Thus, the method may still permit, for any noise, interference, or blocking, condition, the use of an external combiner, duplexer, or diplexer, resulting in reduced TX power operation but integrating into possible existing infrastructures.

While insertion of one or more filters between the antenna and the receiver has been described, in embodiments, one or more filters may be inserted between the antenna and the transmitter. For example, the position of the transmitter and the receiver in the circuit may be switched, such that the TX path may be filtered, and with the RX path having no added loss.

Systems, apparatuses, and methods according to the disclosure may provide various advantages. For example, infrastructure costs may be lowered, without the need to use large and expensive combiners, duplexers, or diplexers. Because the filter only needs to handle power associated with the RX signal (instead of that associated with a combined TX and RX path), the filters does not need to handle high RF power levels. Thus, smaller and less expensive filters may be used. Filters may be replaced or combined based on interference, or for maintenance or upgrades, without needing to access or modify the transceiver system itself. Site installations may require less real estate space. Insertion losses in the RX path from the filter and the TX chain from the combiner are avoided. Further, there is no need to design complex integrated (internal) filters in the RX chain, which may not even be effective. Moreover, a traditional duplexer/diplexer configuration may still be used if desired, using only two ports, TX and RX Input. Similar advantages may apply with reference to the RX path in configurations where the filter is inserted in the TX path, and with the RX path being unfiltered.

FIG. 1 is a block diagram showing a transceiver system 10 connectable to a transceiver antenna 12 and to at least one filter 14. The filter 14 may be used to selectively attenuate interference in a receiver (RX) path 16 of the transceiver system 10, without introducing losses or without substantially affecting signal transmission in a transmitter (TX) path 18 of the transceiver system.

The transceiver system 10 may include a transmitter 20 and a receiver 22, for example an RF transmitter and receiver. The transceiver system 10 further includes an antenna port 24 that is connectable to the transmitter 20 or to the receiver 22. For example, the antenna 12 may be connectable to the transmitter 20 via the TX path 18, or to the receiver 22 via the RX path 16.

The transceiver system may further include a filter send port 26, and a filter return port 28. The filter send and return ports 26 and 28 may be used to connect the filter 14 to the system 10, and in particular along or in the RX path 16. The filter send and return ports 26 and 28 may be connectable across at least one filter 14 between the antenna port 24 and the receiver 22. For example, the filter send and return ports 26 or 28 may be screw-on, press-on, or clip-on ports to which cables may be connected to introduce filter 14 across the ports 26 or 28. Thus, the filter 14 may be an external component that may ultimately be connected to the transceiver system 10.

More than one filter 14 may be present. For example, at least two filters, such as two, three, four, or more filters, may be connected in any combination of series or parallel. Filter 14 may be combined with or replaced with one or more different or identical filters, for example, other filters having similar or different filter characteristics.

The filter 14 may include a low pass, high pass, band pass, band stop, or other types of filters, or any suitable combination thereof. The filter 14 may be an RF filter, or may operate at other frequencies. The filter 14 may be a passive filter, or an active filter. In embodiments, a power source may be connected to the filter 14. In some embodiments, the filter 14 may draw power from the transceiver system 10 itself, or from a signal received via the antenna 12.

One of the filter send or return ports 26 or 28 may be on antenna-side 27 (indirectly or directly coupled to the antenna 12 or the antenna port 24), and the other of the port 26 or 28 may be on receiver-side 29 (indirectly or directly coupled to the receiver 22). For example, a path to the antenna 12 via the antenna port 24 may be associated with one of the ports 26 or 28, while the RX path may be associated with the other of the ports 26 or 28.

In embodiments, the transmitter 20 is isolated from each of the filter send and return ports 26 and 28. Thus, the presence of the filter 14 may not interfere with the TX path 18 or otherwise with the transmitter 20. For example, one or more switches may be used to toggle between RX and TX paths 16 and 18, while isolating these paths from each other or from other components of the transceiver system 10.

In embodiments, the transceiver system 10 further includes a transceiver switch 30 configured to connect the antenna port 24 to (i) the transmitter 20, or (ii) the receiver 22. The transceiver switch 30 may be used switch between TX and RX modes. For example, the transceiver switch 30 may connect only the RX path 16 to the antenna port 24 (and ultimately, to the antenna 12) in the RX mode. Likewise, the switch 30 may connect only the TX path 18 to the antenna port 24 (and ultimately, to the antenna 12) in the TX mode. The transceiver switch 30 may be a single-pole double-throw switch, or a toggle, or any other suitable switch. The transceiver switch 30 may include integrated or discrete components.

The RX path 16 may also be connected to or isolated from the filter send and return ports 26 and 28 (and ultimately from the filter 14) via switching. In embodiments, the transceiver system 10 may further include a filter switch assembly 32. The filter switch assembly 32 may be configured to connect the receiver 22 and the antenna port 24 through (i) the filter 14, or (ii) an unfiltered path 33 isolated from each of the filter send and return ports 26 and 28. The unfiltered path 33 directly connects the receiver 22 to the antenna port 24, without any filtering by the filter 14. The filter switch assembly 32 may include a multi-pole switch, or a combination of single pole switches or toggles. In some embodiments, the filter switch assembly 32 includes a first filter switch 34. The first filter switch 34 is configured to connect the receiver 22 to one of the (i) the filter return port 28, or (ii) the unfiltered path 33. The filter switch assembly 32 may further include a second filter switch 36 configured to connect the antenna 12 (or the antenna port 24) to (i) the filter send port 26, or (ii) the unfiltered path 33. One or both of the first and second filter switches 34 and 36 may be a single-pole double-throw switch. One or both of the first and second filter switches 34 and 36 may include integrated or discrete components. Thus, the filter 14 may be connected to or isolated from the receiver 22 via one or more switches.

In embodiments, the switches 34 and 36 may not be present, and the unfiltered path 33 may not be provided. In some such embodiments, the receiver 22 may be directly connected to the return port 28 (without the switch 34) along the path 16, and the send port 26 may be connected to the antenna port 24 without the switch 36. In such embodiments, a jumper may be provided between the ports 26 and 28 when filtering is not needed.

In embodiments, the transceiver system further includes a controller 40. The controller 40 may operate or control one or more components of the transceiver system 10. The controller 40 may control one or more components by wired or wireless signals.

The controller 40 may be configured to switch the filter switch assembly 32 in response to a first signal and the transceiver switch 30 in response to a second signal. For example, the controller 40 may cause the filter switch assembly 32 to toggle between the unfiltered path 33 or the filtered path 16 to appropriately connect the receiver without or with filtering to the antenna port 24.

In embodiments, the controller 40 is configured to switch the filter switch assembly 32 to connect the receiver 22 and the antenna port 24 through (i) the filter 14 in response to detecting a presence of interference, and (ii) the unfiltered path 33 in response to detecting low interference or an absence of interference. In this way, if interference is lower than a threshold, or absent, the filter 14 may be isolated from the receiver 22, to avoid any potential losses through the filter 14.

In embodiments, the transceiver system 10 further include a housing 50. The housing 50 may be formed of or include a metal, an alloy, a plastic, a composite, or any suitable material. The housing 50 may be water resistant or water proof. The housing 50 may include the transmitter 20 and the receiver 22, with the filter 14 configured to be coupled external to the housing 50 between the filter send and return ports 26 and 28.

FIG. 2 is a diagram showing a connector view of a transceiver apparatus 60 connectable to a transceiver antenna and to a filter. The apparatus 60 may include the housing 50. The housing 50 may include a transmitter, a receiver, a transceiver switch, and a filter switch assembly (each being as described with reference to the system 10 of FIG. 1) in a chamber of the housing 50. The housing may further include the antenna port 24, the filter send port 26, and the filter return port 28, accessible through a wall of the housing. The housing 50 may include further components and connections, for example, for a power supply, and for internet or network connectivity.

In the transceiver apparatus 60, one of the filter send and return ports 26 or 28 may be antenna-side, with the other of the filter send and return ports 26 and 28 being receiver-side. The filter ports 26 and 28 may be connectable across the at least one filter 14 external to the housing 60 between the antenna port 24 and the receiver. The transmitter may be isolated from each of the filter ports 26 and 28.

FIG. 3 is a diagram showing an assembly 100 including the transceiver apparatus 60 of FIG. 2 connected to the transceiver antenna 12 and to the filter 14. The user may replace or combine the filter 14 with other filters, without needing to open the housing 50 of the transceiver apparatus 60, or without needing to access or modify any component internal to the housing 50 of the transceiver apparatus 60.

The transceiver apparatus 60 may be provided with one or more filters as a kit.

FIG. 4 is a diagram showing a kit 200 including a case or an enclosure 202 including the transceiver apparatus 60 and at least one filter 14. The case 202 may be formed of a metal, an alloy, a plastic, a fabric, a composite material, or combinations thereof. The case 202 may be a clamshell case, or any other suitable case. The case 202 may be soft or rigid. The case 202 may define a single internal compartment, or separate dedicated compartments for the transceiver apparatus 60 or at least one filter 14. The case 202 may include additional compartments or clips for holding additional filters suitable for use with the transceiver apparatus 60. For example, the kit may include at least two filters configured to filter different interference signals. The at least two filters are configured to be used separately or together in any combination of series or parallel.

While the system 10 of FIG. 1, the apparatus 60 of FIG. 2, the assembly 100 of FIG. 3, and the kit 200 of FIG. 4 have been described with reference to connecting a receiver to a filter or otherwise filtering an RX path, similar systems, apparatuses, assemblies, and kits may be used to connect a transmitter to a filter or otherwise filter a TX path. For example, the position of the transmitter 20 and the receiver 22 may be switched with other components remaining the same and having the same configuration, so that the filter 14 may be inserted between the transmitter 20 and the antenna port 24 (instead of between the receiver 22 and the antenna port 24).

FIG. 5 is a block diagram showing a transceiver system 300 connectable to the transceiver antenna 12 and to the at least one filter 14. The transceiver system 300 of FIG. 5 is substantially the same as the transceiver system 10 of FIG. 1, but differing in the position of the radio receiver 22 and the transmitter 20. In particular, the positions of the radio receiver 22 and the transmitter 20 shown in FIG. 1 are exchanged in FIG. 5, with the other components remaining the same. Thus, in the transceiver system 300, the path 18 is an RX path, and the path 16 is a TX path, and the filter 14 may be used to selectively attenuate interference in the TX path 16 of the transceiver system 10, without introducing losses or without substantially affecting signal transmission in the RX path 18 of the transceiver system 300. In the transceiver system 300, the filter 14 is insertable between the transmitter 20 and the antenna port 24 (in a manner similar to inserting the filter 14 between the receiver 22 and the antenna 24 described with reference to the transceiver system 10 of FIG. 1).

The apparatus 60 of FIG. 2 may include components as described with reference to the transceiver 300 of FIG. 5, with one of the filter send and return ports 26 or 28 being antenna-side, with another of the filter send and return ports 26 and 28 being transmitter-side. The filter ports 26 and 28 may be connectable across the at least one filter 14 external to the housing 60 between the antenna port 24 and the transmitter. The receiver may be isolated from each of the filter ports 26 and 28. Such an apparatus may be alternatively provided in the assembly 100 of FIG. 3 or the kit 200 of FIG. 4. Thus, the filter 14 may be introduced in the TX path, without adding a loss in the RX path. Such a configuration may be used to remove or reduce interference In embodiments, the present disclosure describes a method for filtering a signal. For example, the method may filter a signal between an antenna (or an antenna port) and a receiver, or an RX path. The method may include switching, by a controller, in response to a first signal, a receiver of a transceiver system from an unfiltered path connected to an antenna port to a filtered path connected to the antenna port. The filtered path may include a filter connected between a filter send port and a filter return port of the transceiver system. The filtered path may be isolated from a transmitter of the transceiver system. The method may further include switching, by a controller, in response to a second signal, the receiver from the filtered path to the unfiltered path.

In embodiments, the present disclosure describes a method for filtering a signal between an antenna (or an antenna port) and a transmitter, or a TX path. In embodiments, the method may include switching, by a controller, in response to a first signal, a transmitter of a transceiver system from an unfiltered path connected to an antenna port to a filtered path connected to the antenna port. The filtered path may include a filter connected between a filter send port and a filter return port of the transceiver system. The filtered path may be isolated from a receiver of the transceiver system. The method may further include switching, by a controller, in response to a second signal, the transmitter from the filtered path to the unfiltered path.

In either method of filtering the RX path or the TX path, the first signal may be indicative of a presence of interference, and wherein the second signal is indicative of an absence of interference. Either method may further include connecting the at least one filter between the filter send port and the filter return port. For example, a user may select a suitable filter couple the filter between the filter send port and the filter return port.

That which is claimed is:

1. A transceiver system connectable to at least one filter, the transceiver system comprising:
   a housing;
   a transmitter disposed in the housing;
   a receiver disposed in the housing;
   an antenna port being connectable to the transmitter and to the receiver, wherein a transmitter path in the housing connects the transmitter to the antenna port and a receiver path in the housing connects the receiver to the antenna port, and wherein the receiver path comprises an unfiltered path and a filtered path;

a filter send port of the filtered path;

a filter return port of the filtered path; and at least one filter of the filtered path, wherein the at least one filter is positioned external to the housing and between the filter send port and the filter return port, wherein the filtered path connects the filter send port to the at least one filter and the at least one filter to the filter return port, and wherein one of the filter send port and the filter return port is antenna-side and the other of the filter send port and the filter return port is receiver-side.

2. The transceiver system of claim 1, wherein the transmitter is isolated from each of the filter send port and the filter return port by a switch configured to select one of the transmitter path or the receiver path at a time.

3. The transceiver system of claim 1, wherein the at least one filter is externally coupled to the housing via the filter send port and the filter return port.

4. The transceiver system of claim 1, further comprising a second filter of the filtered path and connected in any combination of series or parallel with the at least one filter.

5. The transceiver system of claim 1, further comprising a filter switch assembly, wherein the filter switch assembly is configured to connect the receiver and the antenna port through (i) the at least one filter, or (ii) an unfiltered path isolated from each of the filter send port and the filter return port.

6. The transceiver system of claim 5, wherein the filter switch assembly comprises:

a first filter switch configured to connect the receiver to (i) the filter return port, or (ii) the unfiltered path; and a second filter switch configured to connect the antenna to (i) the filter send port, or (ii) the unfiltered path.

7. The transceiver system of claim 6, wherein each of the first filter switch and the second filter switch is a single-pole double-throw switch.

8. The transceiver system of claim 5, further comprising a transceiver switch configured to connect the antenna port to (i) the transmitter, or (ii) the receiver.

9. The transceiver system of claim 8, wherein the transceiver switch is a single-pole double-throw switch.

10. The transceiver system of claim 8, further comprising a controller configured to switch the filter switch assembly in response to a first signal and the transceiver switch in response to a second signal.

11. The transceiver system of claim 10, wherein the controller is configured to switch the filter switch assembly to connect the receiver and the antenna port through (i) the at least one filter in response to detecting a presence of interference, and (ii) the unfiltered path in response to detecting an absence of interference.

12. The transceiver system of claim 1, further comprising an antenna connected to the antenna port.

13. A transceiver apparatus connectable to at least one filter, the transceiver apparatus comprising:

a housing comprising:

a transmitter, a receiver, a transceiver switch, a filter switch assembly, an antenna port, at least one filter of a receiver path, a filter send port of the receiver path, and a filter return port of the receiver path, wherein a transmitter path in the housing connects the transmitter to the antenna port and the receiver path in the housing connects the receiver to the antenna port, wherein the receiver path comprises an unfiltered path and a filtered path, wherein the at least one filter is positioned external to the housing and between the filter send port and the filter return port, wherein the filtered path connects the filter send port to the at least one filter and the at least one filter to the filter return port, and wherein one of the filter send port and the filter return port is antenna-side and the other of the filter send port and the filter return port is receiver-side, wherein the transmitter is isolated from each of the filter send port and the filter return port, wherein the filter switch assembly is configured to connect the receiver and the antenna port through (i) the at least one filter, or (ii) an unfiltered path isolated from each of the filter send port and the filter return port, and wherein the transceiver switch is configured to connect the antenna port to (i) the transmitter, or (ii) the receiver.

14. The transceiver apparatus of claim 13, wherein the transceiver apparatus is disposed in a case disposed in a kit.

15. The transceiver apparatus of claim 14, further comprising a second filter of the filtered path and configured to filter different interference signals.

16. The transceiver apparatus of claim 15, wherein the at least one filter and the second filter are configured to be used separately or together in any combination of series or parallel.

17. A method for filtering a signal comprising:

switching, by a controller, in response to a first signal, a receiver disposed in a housing of a transceiver system from an unfiltered path connected to an antenna port disposed in the housing to a filtered path connected to the antenna port, a transmitter path in the housing connects a transmitter disposed in the housing to the antenna port and a receiver path in the housing connects the receiver to the antenna port, and wherein the receiver path comprises the unfiltered path and the filtered path; and switching, by a controller, in response to a second signal, the receiver from the filtered path to the unfiltered path, wherein the filtered path comprises a filter positioned external to the housing and between a filter send port of the filtered path and a filter return port of the filtered path, wherein the filtered path connects the filter send port to the filter and the filter to the filter return port, and wherein the filtered path is isolated from a transmitter of the transceiver system.

18. The method of claim 17, wherein the first signal is indicative of a presence of interference, and wherein the second signal is indicative of an absence of interference.

* * * * *